United States Patent
Hu

(10) Patent No.: US 11,801,517 B2
(45) Date of Patent: Oct. 31, 2023

(54) METHOD FOR RECOVERING GOLD IN CYANIDE TAILING BY HIERARCHICAL RAMIFIED FLOTATION

(71) Applicants: Gannan University of Science and Technology, Ganzhou (CN); Chongyi Zhangyuan Tungsten Co., Ltd, Ganzhou (CN)

(72) Inventor: Haixiang Hu, Ganzhou (CN)

(73) Assignees: Gannan University of Science and Technology, Ganzhou (CN); Chongyi Zhangyuan Tungsten Co., Ltd, Ganzhou (CN)

(*) Notice: Subject to any disclaimer, the term of this patent is extended or adjusted under 35 U.S.C. 154(b) by 400 days.

(21) Appl. No.: 17/168,858

(22) Filed: Feb. 5, 2021

(65) Prior Publication Data
US 2021/0260604 A1   Aug. 26, 2021

(30) Foreign Application Priority Data
Feb. 20, 2020   (CN) .......................... 202010105889.5

(51) Int. Cl.
```
B03D 1/02      (2006.01)
B03D 1/018     (2006.01)
B03D 1/08      (2006.01)
C01G 7/00      (2006.01)
```

(52) U.S. Cl.
CPC ............ *B03D 1/025* (2013.01); *B03D 1/018* (2013.01); *B03D 1/082* (2013.01); *C01G 7/00* (2013.01); *B03D 2201/005* (2013.01); *B03D 2201/007* (2013.01); *B03D 2201/02* (2013.01); *B03D 2201/04* (2013.01); *B03D 2203/025* (2013.01)

(58) Field of Classification Search
CPC .............................. C07V 333/04; B03D 1/012
See application file for complete search history.

*Primary Examiner* — Chester T Barry
(74) *Attorney, Agent, or Firm* — Don D. Cha; HDC Intellectual Property Law, LLP

(57) ABSTRACT

Provided is a method for recovering gold in a cyanide tailing by hierarchical ramified flotation. The method divides a cyanide tailing into coarse and fine-grained products through screen classification, making preparation for hierarchical ramified flotation. The method then conducts flotation of the coarse and fine-grained products with suitable process parameters and reagent systems, and selects a suitable coarse-grained flotation product as a carrier of fine-grained flotation to maximize the recovery efficiency of fine grains. The method improves the overall recovery rate of gold with the hierarchical ramified flotation of coarse and fine grains, series-carrier flotation and combined reagent enhanced flotation. The method has an advanced process, a good separation effect, and can effectively recover fine-grained gold in the cyanide tailing.

2 Claims, 1 Drawing Sheet

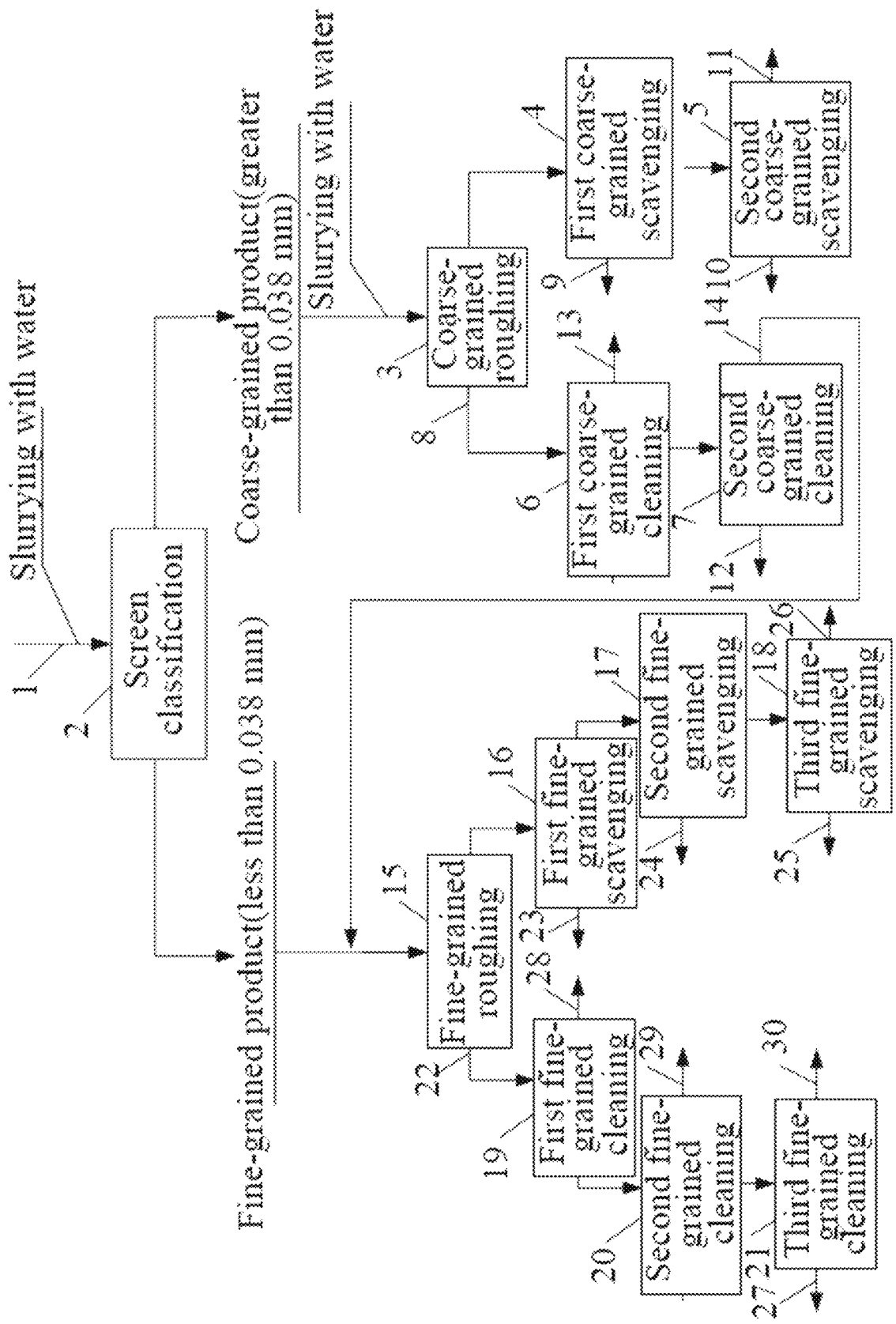

METHOD FOR RECOVERING GOLD IN CYANIDE TAILING BY HIERARCHICAL RAMIFIED FLOTATION

CROSS-REFERENCE TO RELATED APPLICATIONS

This application claims priority benefit of Chinese Patent Application No. 202010105889.5, filed Feb. 20, 2020, which is incorporated herein by reference in its entirety.

FIELD OF THE INVENTION

The present disclosure belongs to the technical field of mineral processing, and specifically relates to a method for recovering gold in a cyanide tailing by hierarchical ramified flotation, which is particularly suitable for gold recovery from a cyanide tailing with uneven grain size distribution.

BACKGROUND OF THE INVENTION

The cyanide process is an important gold extraction technology for gold mines. A large amount of cyanide tailings are produced during the cyanide process, in which the gold grade can reach 1-8 g/t. Cyanide tailings are commonly treated through landfilling, which wastes resources and pollutes the environment. At present, some mines recover gold and silver by using two flotation methods. One method is to conduct full-size flotation of cyanide tailings to obtain a gold concentrate, and then conduct cyanide leaching and deposition-precipitation to obtain gold. The other method is to enrich gold and silver into a nonferrous metal (such as copper, lead) concentrate by flotation, and then conduct pyrometallurgy to obtain gold, silver and copper or lead.

Cyanide tailings contained abundant fine grains (quality percentage of less than 0.074 mm generally accounts for more than 80%), which caused silicate minerals to seriously be slimed. Since the point of zero charge (PZC) of various minerals were different, in the same pulp environment, the charged particles on the surface affected each other, resulting in increased non-selective adsorption of the flotation reagents and increased viscosity of the pulp during the flotation process. The surface of valuable minerals would adsorb other ions to form an electric double layer (EDL), and a thick hydration shell would appear, which weakened the ability of flotation reagents to collect valuable minerals. During the flotation process, different sizes of grains with greatly varying properties were mixed together, and valuable minerals and gangue minerals affected each other. In addition, a large number of chemical reagents added in the cyanide process would lead to great changes in the surface properties of the minerals, and even inhibit many minerals coated with gold, making them difficult to float. All of these caused the floatability of gold minerals in the cyanide tailings to be greatly reduced, making the recovery very difficult.

An existing patent "Method for recovering gold from cyanide tailings" (Patent No. 2017112413846) included the steps of raw ore pretreatment, roughing, scavenging and cleaning, by using combined collectors Y-89 and YP-35 and combined inhibitors sodium silicate and Linx385. This method had a good flotation effect on gold wrapped in a sulfide ore. However, it adopted a full-size flotation method without considering that different sizes of grains had different properties, so it couldn't ensure the recovery effect of valuable minerals in cyanide tailings in which coarse and fine grains affected with each other or serious sliming occurs.

SUMMARY OF THE INVENTION

An objective of the present disclosure is to provide a method for recovering gold in a cyanide tailing by hierarchical ramified flotation. The present disclosure improves the comprehensive utilization of gold resources.

The present disclosure mainly adopts the following technical ideas. Screen classification of a raw ore (a cyanide tailing) is conducted to obtain coarse and fine-grained products, and the coarse and fine-grained products are floated separately according to appropriate process parameters and reagent systems. An appropriate coarse-grained flotation product is chosen as a carrier medium for a fine-grained flotation system to achieve series-carrier flotation, which improves the recovery efficiency of fine grains. Coarse and fine-grained flotation concentrates are combined into a final gold concentrate, and coarse and fine-grained flotation tailings are combined into a final tailing.

The present disclosure adopts a technical solution as follows: a method for recovering gold in a cyanide tailing by hierarchical ramified flotation, including the following steps:

step 1: screen classification: slurrying a cyanide tailing 1 with water according to a mass concentration of 30-40%, and then conducting screen classification 2 through a Taylor standard sieve with a mesh size of 0.038 mm to obtain a coarse-grained product and a fine-grained product;

step 2: coarse-grained roughing: slurrying the coarse-grained product obtained in step 1 with water according to a mass concentration of 30-35%; then sequentially adding a dispersant (sodium silicate: 500-700 g/t), an activator (copper sulfate: 100-120 g/t), a combined collector (MA-1: 30-40 g/t; ammonium dibutyl dithiophosphate: 15-20 g/t) and a frother (terpenic oil: 10 g/t); conducting coarse-grained roughing 3 to obtain a coarse-grained roughing concentrate 8 and a coarse-grained roughing tailing;

step 3: first coarse-grained scavenging: adding a combined collector (MA-1: 15-20 g/t; ammonium dibutyl dithiophosphate: 10-15 g/t) and a frother (terpenic oil: 5 g/t) to the coarse-grained roughing tailing obtained in step 2; conducting first coarse-grained scavenging 4 to obtain a first coarse-grained scavenging concentrate 9 and a first coarse-grained scavenging tailing; returning the first coarse-grained scavenging concentrate 9 to the coarse-grained roughing 3 in step 2;

step 4: second coarse-grained scavenging: adding a combined collector (MA-1: 8-10 g/t; ammonium dibutyl dithiophosphate: 5-8 g/t) to the first coarse-grained scavenging tailing obtained in step 3; conducting second coarse-grained scavenging 5 to obtain a second coarse-grained scavenging concentrate 10 and a second coarse-grained scavenging tailing 11; returning the second coarse-grained scavenging concentrate 10 to the first coarse-grained scavenging 4 in step 3;

step 5: first coarse-grained cleaning: adding a dispersant (sodium silicate: 200-300 g/t) to the coarse-grained roughing tailing 8 obtained in step 2; conducting first coarse-grained cleaning 6 to obtain a first coarse-grained cleaning concentrate and a first coarse-grained cleaning tailing 13; returning the first coarse-grained cleaning tailing 13 to the coarse-grained roughing 3 in step 2;

step 6: second coarse-gained cleaning: subjecting the first coarse-gained cleaning concentrate obtained in step 5 to second coarse-gained cleaning 7 without adding any reagent to obtain a second coarse-gained cleaning concentrate 12 and a second coarse-gained cleaning tailing 14; combining the second coarse-grained cleaning tailing 14 with the fine-grained product obtained by the screen classification 2 in step 1;

step 7: fine-grained roughing: sequentially adding a dispersant (sodium silicate: 1000-1200 g/t), an activator (copper sulfate: 100-120 g/t), a combined collector (MOS-2: 30-40 g/t; MA-1: 10-16 g/t) and a frother (terpenic oil: 20-30 g/t) to a combined pulp of the fine-grained product obtained in step 1 and the second coarse-grained cleaning tailing 14 obtained in step 6; conducting fine-grained roughing 15 to obtain a fine-grained roughing concentrate 22 and a fine-grained roughing tailing;

step 8: first fine-grained scavenging: adding a dispersant (sodium silicate: 500-600 g/t), a combined collector (MOS-2: 15-20 g/t; MA-1: 5-8 g/t) and a frother (terpenic oil: 10-15 g/t) to the fine-grained roughing tailing obtained in step 7; conducting first fine-grained scavenging 16 to obtain a first fine-grained scavenging concentrate 23 and a first fine-grained scavenging tailing; returning the first fine-grained scavenging concentrate 23 to the fine-grained roughing 15 in step 7;

step 9: second fine-grained scavenging: adding a combined collector (MOS-2: 8-10 g/t; MA-1: 5 g/t) and a frother (terpenic oil: 5-8 g/t) to the fine-grained scavenging tailing obtain in step 8; conducting second fine-grained scavenging 17 to obtain a second fine-grained scavenging concentrate 24 and a second fine-grained scavenging tailing; returning the second fine-grained scavenging concentrate 24 to the first fine-grained scavenging 16 in step 8;

step 10: third fine-grained scavenging: subjecting the second fine-grained scavenging tailing obtained in step 9 to third fine-grained scavenging 18 without adding any reagent to obtain a third fine-grained scavenging concentrate 25 and a third fine-grained scavenging tailing 26; returning the third fine-grained scavenging concentrate 25 to the second fine-grained scavenging 17 in step 9;

step 11: first fine-grained cleaning: adding a dispersant (sodium silicate: 600-700 g/t), a collector (MOS-2: 20-30 g/t) and a frother (terpenic oil: 10-15 g/t) to the fine-grained roughing concentrate 22 obtained in step 7; conducting first fine-grained cleaning 19 to obtain a first fine-grained cleaning concentrate and a first fine-grained cleaning tailing 28; returning the first fine-grained cleaning tailing 28 to the fine-grained roughing 15 in step 7;

step 12: second fine-grained cleaning: adding a collector (MOS-2: 10-15 g/t) and a frother (terpenic oil: 5-8 g/t) to the first fine-grained cleaning concentrate obtained in step 11; conducting second fine-grained cleaning 20 to obtain a second fine-grained cleaning concentrate and a second fine-grained cleaning tailing 29; returning the second fine-grained cleaning tailing 29 to the first fine-grained cleaning 19 in step 11;

step 13: third fine-grained cleaning: subjecting the second fine-grained cleaning concentrate obtained in step 12 to third fine-grained cleaning 21 without adding any reagent to obtain a third fine-grained cleaning concentrate 27 and a third fine-grained cleaning tailing 30; returning the third fine-grained cleaning tailing 30 to the second fine-grained cleaning 20 in step 12; and step 14: obtaining of final gold concentrate and final tailing: combining the second coarse-grained cleaning concentrate 12 obtained in step 6 and the third fine-grained cleaning concentrate 27 obtained in step 13 into a final gold concentrate; combining the second coarse-grained scavenging tailing 11 obtained in step 4 and the third fine-grained scavenging tailing 26 obtained in step 10 into a final tailing.

The present disclosure provides a technical reference for the recovery of other tailing resources and flotation recovery of valuable minerals in ores that are significantly affected by sliming or contain a lot of fine grains.

In the cyanide tailing, coarse and fine grains are mixed together, and valuable minerals and gangue (especially sludge) affect each other. If full-size flotation is used, it will lead to poor selectivity of flotation reagents and sticky foam, etc., which makes it hard to improve indicators of gold concentrate flotation. In the present disclosure, the coarse and fine grains are subjected to screen classification, hierarchical ramified flotation and separate enhanced flotation with suitable process parameters and reagent systems, which effectively improves the flotation efficiency. The grains in the cyanide tailing are extremely fine, and it is difficult to improve the gold grade and recovery rate at the same time by using a single-component reagent for recovery. The present disclosure combines a strong collecting ability of xanthate reagent MA-1 with excellent selectivity of ammonium dibutyl dithiophosphate and MOS-2, fully exerting the synergistic effect between the reagents, promoting the recovery of the difficult-to-select gold mineral, and ensuring the flotation effect of fine grains. The present disclosure selects a suitable coarse-grained flotation product as a carrier for fine-grained flotation, improving the flotation effect of fine grains and improving the recovery rate of the fine grains.

The present disclosure innovatively conducts hierarchical ramified flotation of coarse and fine grains with screen classification, conducts separate enhanced flotation with suitable reagents, and selects a suitable coarse-grained flotation product as a fine-grained flotation carrier, thereby improving the recovery effect of gold. The present disclosure divides the cyanide tailing into coarse and fine-grained products with screen classification, making preparation for hierarchical ramified flotation. The present disclosure then conducts flotation of the coarse and fine-grained products with suitable process parameters and reagent systems, and selects a suitable coarse-grained flotation product as a carrier of fine-grained flotation to maximize the recovery efficiency of fine grains. The present disclosure improves the overall recovery rate of gold with the hierarchical ramified flotation of coarse and fine grains, series-carrier flotation and combined reagent enhanced flotation.

The present disclosure has an advanced process, a good separation effect, and can effectively recover fine-grained gold in the cyanide tailing. The present disclosure achieves an Au grade of ≥16.03 g/t in a final gold concentrate and an Au recovery rate of ≥76.81%, effectively improving the comprehensive utilization of the cyanide tailing resource and bringing economic benefits to enterprises.

BRIEF DESCRIPTION OF THE DRAWINGS

FIG. 1 is a flowchart of a method according to the present disclosure.

DETAILED DESCRIPTION OF THE INVENTION

As shown in FIG. 1, a raw ore 1 is slurried and subjected to screen classification 2 to obtain a coarse-grained product and fine-grained product. The coarse-grained product is slurried and then subjected to coarse-grained roughing 3, first coarse-grained scavenging 4 and second coarse-grained scavenging 5 to obtain a coarse-grained roughing concentrate 8, a first coarse-grained scavenging concentrate 9, a second coarse-grained scavenging concentrate 10 and a second coarse-grained scavenging tailing 11. The coarse-grained roughing concentrate 8 is processed by first coarse-grained cleaning 6 and second coarse-grained cleaning 7 to obtain a first coarse-grained cleaning tailing 13, a second coarse-grained cleaning tailing 14 and a second coarse-grained cleaning concentrate 12. The fine-grained product and the second coarse-grained cleaning tailing 14 are combined and then subjected to fine-grained roughing 15, first fine-grained scavenging 16, second fine-grained scavenging 17 and third fine-grained scavenging 18 to obtain a fine-grained roughing concentrate 22, a first fine-grained scavenging concentrate 23, a second fine-grained scavenging concentrate 24, a third fine-grained scavenging concentrate 25 and a third fine-grained scavenging tailing 26. The fine-grained roughing concentrate 22 undergoes first fine-grained cleaning 19, second fine-grained cleaning 20 and third fine-grained cleaning 21 to obtain a first fine-grained tailing 28, a second fine-grained cleaning tailing 29, a third fine-grained cleaning tailing 30 and a third fine-grained cleaning concentrate 27. The second coarse-grained cleaning concentrate 12 and the third fine-grained cleaning concentrate 27 are combined into a final gold concentrate; the second coarse-grained scavenging tailing 11 and the third fine-grained scavenging tailing 26 are combined into a final tailing.

The first coarse-grained scavenging concentrate 9 and the first coarse-grained cleaning tailing 13 are returned to the coarse-grained roughing 3; the first fine-grained scavenging concentrate 23 and the first fine-grained tailing 28 are returned to the fine-grained roughing 15; the second coarse-grained scavenging concentrate 10, the second fine-grained scavenging concentrate 24, the third fine-grained scavenging concentrate 25, the second fine-grained cleaning tailing 29 and the third fine-grained cleaning tailing 30 are respectively returned to a previous operation task.

The present disclosure is further described below in conjunction with embodiments. A cyanide tailing (raw ore 1) used in the embodiments is generated after grinding and all-slime cyanidation of a gold concentrate obtained by flotation of a vein gold ore beneficiation plant, which has a gold grade of 2.46 g/t. A gold ore is embedded in sulfide ore and gangue as fine grains. The sulfide ore is mainly pyrite and chalcopyrite, and the gangue is mainly quartz, calcite, feldspar, etc. A fineness of the cyanide tailing (raw ore 1) is less than 0.038 mm, accounting for 80.26%.

All flotation reagents used in the present disclosure are commercially available from the market and have been publicly used in the prior art, and MOS-2 and MA-1 are the abbreviated code symbols provided by the manufacturer (HuBei JingJiang Flotation Reagents Co., LTD, China. See, hbjingjiang.com).

Embodiment 1

Step 1: Screen classification: Slurry a raw ore 1 with water according to a mass concentration of 36.58%, and then conduct screen classification 2 through a Taylor standard sieve with a mesh size of 0.038 mm to obtain a coarse-grained product (greater than 0.038 mm) and a fine-grained product (less than 0.038 mm).

Step 2: Coarse-grained roughing: Slurry the coarse-grained product with water according to a mass concentration of 33.26%; then sequentially add a dispersant (sodium silicate: 500 g/t), an activator (copper sulfate: 100 g/t), a combined collector (MA-1: 30 g/t; ammonium dibutyl dithiophosphate: 15 g/t) and a frother (terpenic oil: 10 g/t); conduct coarse-grained roughing 3 to obtain a coarse-grained roughing concentrate 8 and a coarse-grained roughing tailing.

Step 3: First coarse-grained scavenging: Add a combined collector (MA-1: 15 g/t; ammonium dibutyl dithiophosphate: 10 g/t) and a frother (terpenic oil: 5 g/t) to the coarse-grained roughing tailing; conduct first coarse-grained scavenging 4 to obtain a first coarse-grained scavenging concentrate 9 and a first coarse-grained scavenging tailing; return the first coarse-grained scavenging concentrate 9 to the coarse-grained roughing 3.

Step 4: Second coarse-grained scavenging: Add a combined collector (MA-1: 8 g/t; ammonium dibutyl dithiophosphate: 5 g/t) to the first coarse-grained scavenging tailing; conduct second coarse-grained scavenging 5 to obtain a second coarse-grained scavenging concentrate 10 and a second coarse-grained scavenging tailing 11; return the second coarse-grained scavenging concentrate 10 to the first coarse-grained scavenging 4.

Step 5: First coarse-grained cleaning: Add a dispersant (sodium silicate: 200 g/t) to the coarse-grained roughing tailing 8; conduct first coarse-grained cleaning 6 to obtain a first coarse-grained cleaning concentrate and a first coarse-grained cleaning tailing 13; return the first coarse-grained cleaning tailing 13 to the coarse-grained roughing 3.

Step 6: Second coarse-gained cleaning: Subject the first coarse-gained cleaning concentrate to second coarse-gained cleaning 7 without adding any reagent to obtain a second coarse-gained cleaning concentrate 12 and a second coarse-gained cleaning tailing 14; combine the second coarse-grained cleaning tailing 14 with the fine-grained product (less than 0.038 mm) obtained by the screen classification 2.

Step 7: Fine-grained roughing: Sequentially add a dispersant (sodium silicate: 1000 g/t), an activator (copper sulfate: 100 g/t), a combined collector (MOS-2: 30 g/t; MA-1: 10 g/t) and a frother (terpenic oil: 20 g/t) to a combined pulp of the fine-grained product and the second coarse-grained cleaning tailing 14; conduct fine-grained roughing 15 to obtain a fine-grained roughing concentrate 22 and a fine-grained roughing tailing.

Step 8: First fine-grained scavenging: Add a dispersant (sodium silicate: 500 g/t), a combined collector (MOS-2: 15 g/t; MA-1: 5 g/t) and a frother (terpenic oil: 10 g/t) to the fine-grained roughing tailing; conduct first fine-grained scavenging 16 to obtain a first fine-grained scavenging concentrate 23 and a first fine-grained scavenging tailing; return the first fine-grained scavenging concentrate 23 to the fine-grained roughing 15.

Step 9: Second fine-grained scavenging: Add a combined collector (MOS-2: 8 g/t; MA-1: 5 g/t) and a frother (terpenic oil: 5 g/t) to the fine-grained scavenging tailing; conduct second fine-grained scavenging 17 to obtain a second fine-grained scavenging concentrate 24 and a second fine-grained scavenging tailing; return the second fine-grained scavenging concentrate 24 to the first fine-grained scavenging 16.

Step 10: Third fine-grained scavenging: Subject the second fine-grained scavenging tailing to third fine-grained scavenging 18 without adding any reagent to obtain a third fine-grained scavenging concentrate 25 and a third fine-grained scavenging tailing 26; return the third fine-grained scavenging concentrate 25 to the second fine-grained scavenging 17.

Step 11: First fine-grained cleaning: Add a dispersant (sodium silicate: 600 g/t), a collector (MOS-2: 20 g/t) and a frother (terpenic oil: 10 g/t) to the fine-grained roughing concentrate 22; conduct first fine-grained cleaning 19 to obtain a first fine-grained cleaning concentrate and a first fine-grained cleaning tailing 28; return the first fine-grained cleaning tailing 28 to the fine-grained roughing 15.

Step 12: Second fine-grained cleaning: Add a collector (MOS-2: 10 g/t) and a frother (terpenic oil: 5 g/t) to the first fine-grained cleaning concentrate; conduct second fine-grained cleaning 20 to obtain a second fine-grained cleaning concentrate and a second fine-grained cleaning tailing 29; return the second fine-grained cleaning tailing 29 to the first fine-grained cleaning 19.

Step 13: Third fine-grained cleaning: Subject the second fine-grained cleaning concentrate to third fine-grained cleaning 21 without adding any reagent to obtain a third fine-grained cleaning concentrate 27 and a third fine-grained cleaning tailing 30; return the third fine-grained cleaning tailing 30 to the second fine-grained cleaning 20.

Step 14: Obtaining of final gold concentrate and final tailing: Combine the second coarse-grained cleaning concentrate 12 obtained in Step 6 and the third fine-grained cleaning concentrate 27 obtained in Step 13 into a final gold concentrate; combine the second coarse-grained scavenging tailing 11 obtained in Step 4 and the third fine-grained scavenging tailing 26 obtained in Step 10 into a final tailing.

Embodiment 2: Embodiment 2 is the same as Embodiment 1 except for the following differences.

The amount of reagents used in Steps 2, 3, 4, 5, 7, 8, 9, 11 and 12 is different from that in Embodiment 1, as follows. Step 2: Coarse-grained roughing 3: dispersant (sodium silicate: 700 g/t), activator (copper sulfate: 120 g/t), combined collector (MA-1: 40 g/t; ammonium dibutyl dithiophosphate: 20 g/t). Step 3: First coarse-grained scavenging 4: combined collector (MA-1: 20 g/t; ammonium dibutyl dithiophosphate: 15 g/t). Step 4: Second coarse-grained scavenging 5: combined collector (MA-1: 10 g/t; ammonium dibutyl dithiophosphate: 8 g/t). Step 5: First coarse-grained cleaning 6: dispersant (sodium silicate: 300 g/t). Step 7: Fine-grained roughing 15: dispersant (sodium silicate: 1200 g/t), activator (copper sulfate: 120 g/t), combined collector (MOS-2: 40 g/t, MA-1: 16 g/t) and frother (terpenic oil: 30 g/t). Step 8: First fine-grained scavenging 16: dispersant (sodium silicate: 600 g/t), combined collector (MOS-2: 20 g/t, MA-1: 8 g/t) and frother (terpenic oil: 15 g/t). Step 9: Second fine-grained scavenging 17: collector (MOS-2: 10 g/t) and frother (terpenic oil: 8 g/t). Step 11: First fine-grained cleaning 19: dispersant (sodium silicate: 700 g/t), collector (MOS-2: 30 g/t) and frother (terpenic oil: 15 g/t). Step 12: Second fine-grained cleaning 20: collector (MOS-2: 15 g/t) and frother (terpenic oil: 8 g/t).

The test results of the two embodiments are as follows:

| Embodiment | | Product name | Yield (%) | Au grade (g/t) | Au recovery rate (%) |
|---|---|---|---|---|---|
| Embodiment 1 | Final gold concentrate | Second coarse-grained cleaning concentrate | 2.56 | 10.62 | 11.05 |
| | | Third fine-grained cleaning concentrate | 8.36 | 19.35 | 65.76 |
| | | Total | 10.92 | 17.30 | 76.81 |
| | | Final tailing | 89.08 | 0.060 | 23.19 |
| | | Raw ore (cyanide tailing) | 100 | 2.46 | 100.00 |
| Embodiment 2 | Final gold concentrate | Second coarse-grained cleaning concentrate | 3.06 | 9.31 | 11.58 |
| | | Third fine-grained cleaning concentrate | 9.25 | 18.25 | 68.62 |
| | | Total | 12.31 | 16.03 | 80.20 |
| | | Final tailing | 87.69 | 0.045 | 19.80 |
| | | Raw ore (cyanide tailing) | 100 | 2.46 | 100.00 |

The implementation of these two embodiments showed that the present disclosure had an advanced process, a good separation effect, and could recover gold in the cyanide tailing to the greatest extent. In addition, the present disclosure achieved an Au grade of ≥16.03 g/t in the final gold concentrate and an Au recovery rate of ≥76.81%, effectively improving the comprehensive utilization of the cyanide tailing resource.

What is claimed is:

1. A method for recovering gold in a cyanide tailing by hierarchical ramified flotation, comprising the following steps:
   step 1: screen classification: slurrying a cyanide tailing (1) with water according to a mass concentration of 30-40%, and then conducting screen classification (2) through a Taylor standard sieve with a mesh size of 0.038 mm to obtain a coarse-grained product and a fine-grained product;
   step 2: coarse-grained roughing: slurrying the coarse-grained product obtained in step 1 with water according to a mass concentration of 30-35%; then sequentially adding a dispersant (sodium silicate: 500-700 g/t), an activator (copper sulfate: 100-120 g/t), a combined collector (MA-1: 30-40 g/t; ammonium dibutyl dithiophosphate: 15-20 g/t) and a frother (terpenic oil: 10 g/t); conducting coarse-grained roughing (3) to obtain a coarse-grained roughing concentrate (8) and a coarse-grained roughing tailing;
   step 3: first coarse-grained scavenging: adding a combined collector (MA-1: 15-20 g/t; ammonium dibutyl dithiophosphate: 10-15 g/t) and a frother (terpenic oil:

5 g/t) to the coarse-grained roughing tailing obtained in step 2; conducting first coarse-grained scavenging (4) to obtain a first coarse-grained scavenging concentrate (9) and a first coarse-grained scavenging tailing; returning the first coarse-grained scavenging concentrate (9) to the coarse-grained roughing (3) in step 2;

step 4: second coarse-grained scavenging: adding a combined collector (MA-1: 8-10 g/t; ammonium dibutyl dithiophosphate: 5-8 g/t) to the first coarse-grained scavenging tailing obtained in step 3; conducting second coarse-grained scavenging (5) to obtain a second coarse-grained scavenging concentrate (10) and a second coarse-grained scavenging tailing (11); returning the second coarse-grained scavenging concentrate (10) to the first coarse-grained scavenging (4) in step 3;

step 5: first coarse-grained cleaning: adding a dispersant (sodium silicate: 200-300 g/t) to the coarse-grained roughing tailing (8) obtained in step 2; conducting first coarse-grained cleaning (6) to obtain a first coarse-grained cleaning concentrate and a first coarse-grained cleaning tailing (13); returning the first coarse-grained cleaning tailing (13) to the coarse-grained roughing (3) in step 2;

step 6: second coarse-gained cleaning: subjecting the first coarse-gained cleaning concentrate obtained in step 5 to second coarse-gained cleaning (7) without adding any reagent to obtain a second coarse-gained cleaning concentrate (12) and a second coarse-gained cleaning tailing (14); combining the second coarse-grained cleaning tailing (14) with the fine-grained product obtained by the screen classification (2) in step 1;

step 7: fine-grained roughing: sequentially adding a dispersant (sodium silicate: 1000-1200 g/t), an activator (copper sulfate: 100-120 g/t), a combined collector (MOS-2: 30-40 g/t; MA-1: 10-16 g/t) and a frother (terpenic oil: 20-30 g/t) to a combined pulp of the fine-grained product obtained in step 1 and the second coarse-grained cleaning tailing (14) obtained in step 6; conducting fine-grained roughing (15) to obtain a fine-grained roughing concentrate (22) and a fine-grained roughing tailing;

step 8: first fine-grained scavenging: adding a dispersant (sodium silicate: 500-600 g/t), a combined collector (MOS-2: 15-20 g/t; MA-1: 5-8 g/t) and a frother (terpenic oil: 10-15 g/t) to the fine-grained roughing tailing obtained in step 7; conducting first fine-grained scavenging (16) to obtain a first fine-grained scavenging concentrate (23) and a first fine-grained scavenging tailing; returning the first fine-grained scavenging concentrate (23) to the fine-grained roughing (15) in step 7;

step 9: second fine-grained scavenging: adding a combined collector (MOS-2: 8-10 g/t; MA-1: 5 g/t) and a frother (terpenic oil: 5-8 g/t) to the fine-grained scavenging tailing obtain in step 8; conducting second fine-grained scavenging (17) to obtain a second fine-grained scavenging concentrate (24) and a second fine-grained scavenging tailing; returning the second fine-grained scavenging concentrate (24) to the first fine-grained scavenging (16) in step 8;

step 10: third fine-grained scavenging: subjecting the second fine-grained scavenging tailing obtained in step 9 to third fine-grained scavenging (18) without adding any reagent to obtain a third fine-grained scavenging concentrate (25) and a third fine-grained scavenging tailing (26); returning the third fine-grained scavenging concentrate (25) to the second fine-grained scavenging (17) in step 9;

step 11: first fine-grained cleaning: adding a dispersant (sodium silicate: 600-700 g/t), a collector (MOS-2: 20-30 g/t) and a frother (terpenic oil: 10-15 g/t) to the fine-grained roughing concentrate (22) obtained in step 7; conducting first fine-grained cleaning (19) to obtain a first fine-grained cleaning concentrate and a first fine-grained cleaning tailing (28); returning the first fine-grained cleaning tailing (28) to the fine-grained roughing (15) in step 7;

step 12: second fine-grained cleaning: adding a collector (MOS-2: 10-15 g/t) and a frother (terpenic oil: 5-8 g/t) to the first fine-grained cleaning concentrate obtained in step 11; conducting second fine-grained cleaning (20) to obtain a second fine-grained cleaning concentrate and a second fine-grained cleaning tailing (29); returning the second fine-grained cleaning tailing (29) to the first fine-grained cleaning (19) in step 11;

step 13: third fine-grained cleaning: subjecting the second fine-grained cleaning concentrate obtained in step 12 to third fine-grained cleaning (21) without adding any reagent to obtain a third fine-grained cleaning concentrate (27) and a third fine-grained cleaning tailing (30); returning the third fine-grained cleaning tailing (30) to the second fine-grained cleaning (20) in step 12; and step 14: obtaining of final gold concentrate and final tailing: combining the second coarse-grained cleaning concentrate (12) obtained in step 6 and the third fine-grained cleaning concentrate (27) obtained in step 13 into a final gold concentrate; combining the second coarse-grained scavenging tailing (11) obtained in step 4 and the third fine-grained scavenging tailing (26) obtained in step 10 into a final tailing.

2. The method for recovering gold in a cyanide tailing by hierarchical ramified flotation according to claim 1, wherein a fineness of the cyanide tailing (1) is less than 0.038 mm, accounting for 80.26%.

* * * * *